W. F. LANE.
Foot-Power.
No. 206,952. Patented Aug. 13, 1878.
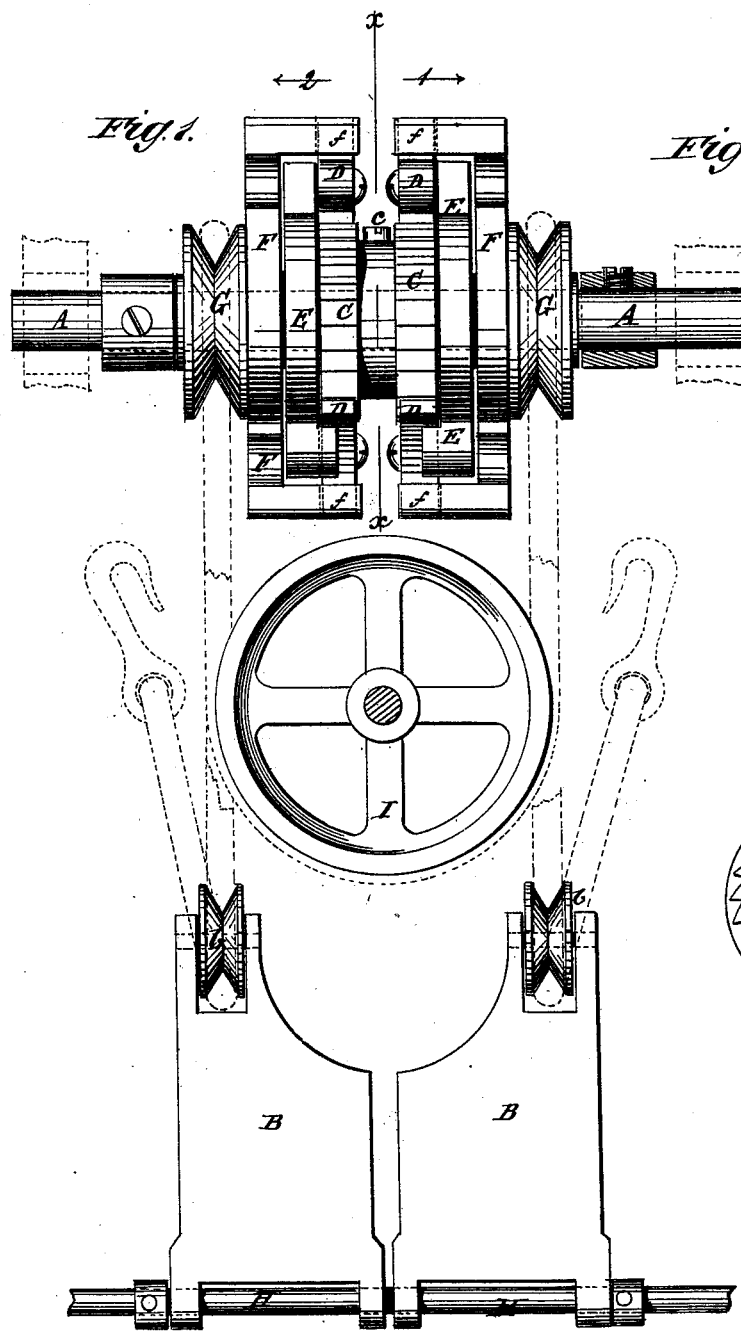
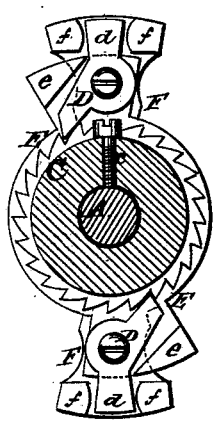
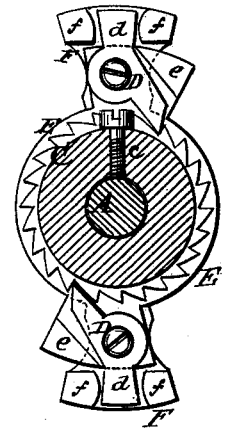
WITNESSES:
Francis McArdle
C. Sedgwick
INVENTOR:
W. F. Lane
BY Munn & Co
ATTORNEYS.

UNITED STATES PATENT OFFICE.

WILLIAM F. LANE, OF ELGIN, ILLINOIS.

IMPROVEMENT IN FOOT-POWERS.

Specification forming part of Letters Patent No. 206,952, dated August 13, 1878; application filed July 2, 1878.

*To all whom it may concern:*

Be it known that I, WILLIAM F. LANE, of Elgin, in the county of Kane and State of Illinois, have invented a new and Improved Foot-Power, of which the following is a specification:

The object of my invention is to provide an improved treadle-movement, whereby the power is applied continuously and evenly in one direction only without springs and the loss of motion and power necessary to pass dead-centers, and by which the operator can control the machine by his feet alone, thus having his hands free to hold or adjust the work.

The invention consists in the construction and combination of the various parts, as will be hereinafter described and claimed.

In the accompanying drawing, Figure 1 represents a front view of my improved foot-power. Fig. 2 is a central cross-section of the same, taken on the line $x\,x$ of Fig. 1, and seen in the direction of arrow 1. Fig. 3 is a similar section on the line $x\,x$, seen in direction of arrow 2.

Similar letters of reference indicate corresponding parts.

A is the main shaft of a sewing-machine or other apparatus, to which motion is to be imparted from the treadles B, the latter being pivoted to oscillate on the shaft H. C are ratchet-wheels, whose teeth are formed upon a collar which is secured firmly upon the shaft A by a set-screw, $c$, or other fastening device, so that the shaft will be revolved simultaneously with the said ratchet-wheels.

The ratchet-wheels C, one on each side of the central cross-section $x\,x$, are each worked by a pawl or pawls, D, pivoted to a carrier plate or disk, E, which latter is arranged to turn loosely upon the shaft A, and flush with the side of the ratchet-wheel C. The pawl D is in the shape of an elbow-lever, the toothed end of which is prevented from rising higher than just clear of the ratchet-teeth by a projection or shoulder, $e$, upon the carrier E. The other end, $d$, of the elbow-lever or pawl D is held between shoulders or projections $f$, formed upon a disk or plate, F, which latter is formed on or attached to the side of a rope-pulley, G, turning loosely upon the shaft A, and bears, with a small collar, against the outer side of the pawl-carrier plate E.

The shoulder $f$ upon the disk F forms a clutch for operating the arm $d$ of the pawl D in such a manner that when the clutch-plate F is turning with the ratchet-teeth the pawl D is raised and rides loosely over the teeth, but when the clutch-plate F is turning in the direction against the teeth of the ratchet-wheel the pawl D is thrown into the teeth of said wheel, and thus pushes the same and the shaft A around with it.

I is a guide-pulley, pivoted somewhere below the shaft A (and the parts turning thereon) in the extension of the central cross-section $x\,x$, the axis of the pulley I being at right angles to the shaft A.

The motion from the alternately-oscillated treadles B is transmitted to the pulleys G by means of a rope, (shown in dotted lines,) both ends of which are fastened by hooks to some stationary point, and which runs from one of the hooks down, behind, under, and around a guide-pulley, $b$, pivoted between lugs in an opening in the rear end of one of the treadles B; thence up behind, over, and around the pulley G vertically above; thence down and around the fixed pulley I; thence up in front of, over, and around the second pulley, G; thence down in front of, under, and around the pulley $b$ in the second treadle, B; and, lastly, up behind the latter pulley to the second fixed hook. Thus the depression of either of the treadles will cause the shaft A to move in the direction away from the operator. It will also raise the other treadle, and cause the corresponding pawl D of the latter to recede and take a new hold on the teeth of the ratchet-wheel C, thus applying the power evenly and continuously only in one direction, and without loss by dead-centers.

Having thus described my invention, I claim as new and desire to secure by Letters Patent—

The combination of the lever-pawls D $d$, the loose carrier-plates E, provided with the shoulders $e$, the loose clutch-plates F, provided with the shoulders $f\,f$, the loose pulleys G, the guide-pulley I, and the small pulleys $b$ with each other, with the ratchet-wheels C, attached to the shaft to be driven, and with the treadles B, substantially as herein shown and described.

WILLIAM FOSTER LANE.

Witnesses:
WM. G. WATERMAN,
JAS. R. LANE.